United States Patent [19]
Rortvedt

[11] Patent Number: 5,452,743
[45] Date of Patent: Sep. 26, 1995

[54] CLIP FOR DOWNSPOUT TIP-UP LATERAL

[75] Inventor: David E. Rortvedt, Waunakee, Wis.

[73] Assignee: Spusta; Richard J., Waunakee, Wis.

[21] Appl. No.: 343,662

[22] Filed: Nov. 22, 1994

[51] Int. Cl.⁶ .................................................. F16L 27/00
[52] U.S. Cl. ................................ 137/615; 52/16; 248/49; 248/300
[58] Field of Search ................................ 137/615; 52/16; 24/563, 326, 336; 248/49, 300; 285/283

[56] References Cited

U.S. PATENT DOCUMENTS

| | | |
|---|---|---|
| 2,975,805 | 3/1961 | Horn. |
| 3,060,952 | 10/1962 | Bystorm .................................. 52/16 X |
| 3,150,851 | 9/1964 | Ritchie et al. ....................... 248/300 X |
| 3,316,928 | 5/1967 | Weakley. |
| 3,330,291 | 7/1967 | Smith. |
| 3,375,851 | 4/1968 | Henry et al.. |
| 3,861,419 | 1/1975 | Johnson. |
| 3,911,954 | 10/1975 | Johnson. |
| 4,135,540 | 1/1979 | Felsen. |
| 4,210,301 | 7/1980 | Weiss ..................................... 52/16 X |
| 4,270,572 | 6/1981 | Jarzynka. |
| 4,406,434 | 9/1983 | Schneckloth .......................... 248/49 X |
| 4,511,107 | 4/1985 | Funk ..................................... 248/49 X |
| 5,014,745 | 5/1991 | Watt. |

Primary Examiner—Martin P. Schwadron
Assistant Examiner—Kevin L. Lee
Attorney, Agent, or Firm—Lathrop & Clark

[57] ABSTRACT

A clip for holding a downspout lateral in the tipped up position has a C-shaped body constructed of transparent, resilient plastic. The clip is resiliently snapped onto a downspout some distance above where a lateral joins the downspout. The C-shaped body of the clip has at least one depending lip for retaining the downspout lateral. The lateral is tilted upwardly until the upper edge of the lateral rests against the clip then the clip is slid down slightly until the lip engages the upper edge of the lateral and thereby retains it.

12 Claims, 2 Drawing Sheets

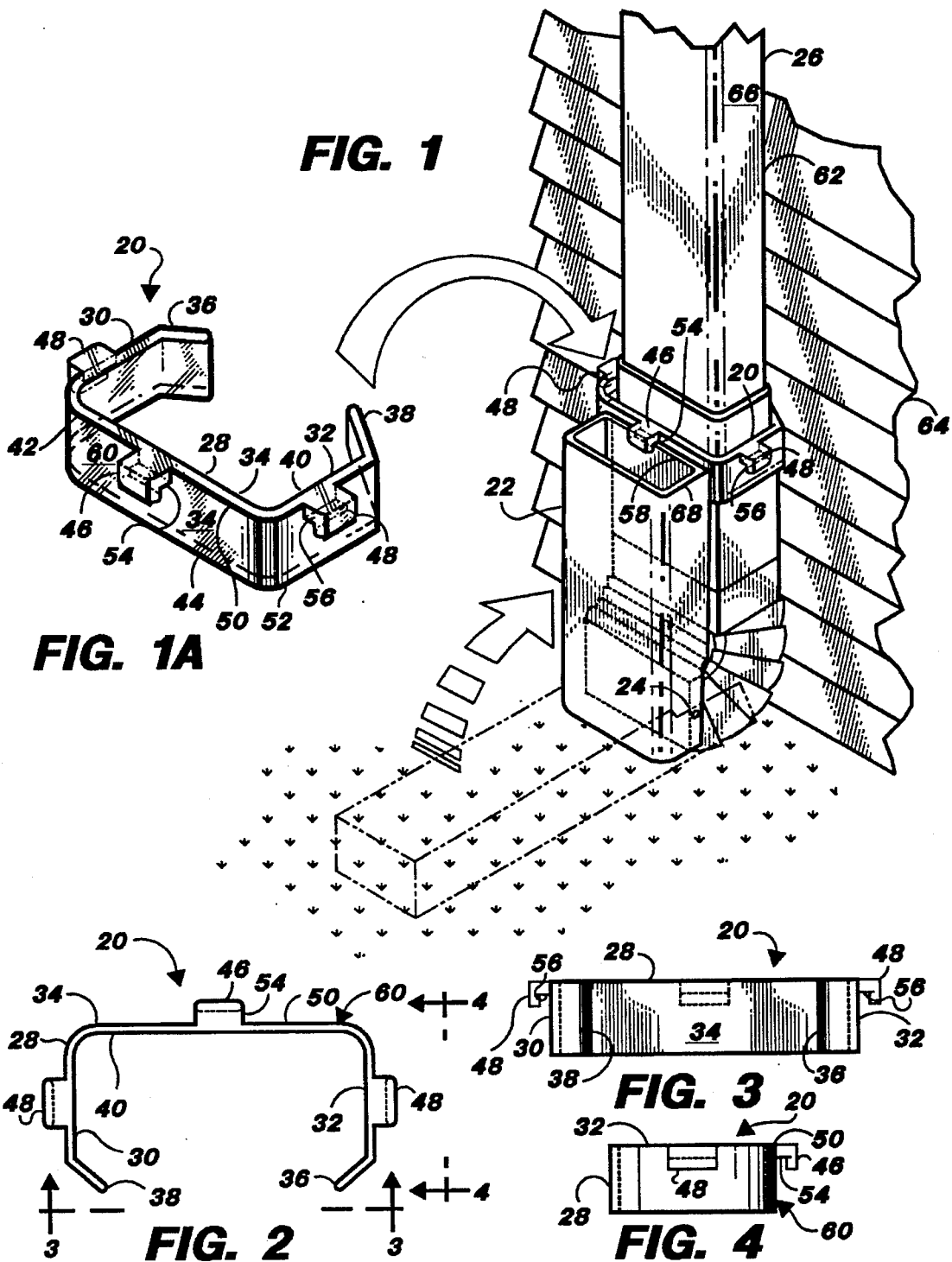

5,452,743

CLIP FOR DOWNSPOUT TIP-UP LATERAL

FIELD OF THE INVENTION

This invention relates generally to rain gutters and downspouts and more particularly to downspouts employing tip-up laterals.

BACKGROUND OF THE INVENTION

Rain gutters are more than a visually interesting architectural detail. They are in fact an integral part of the weatherproof shell of a dwelling or outbuilding. To function properly, rain gutters which collect runoff from the roof must prevent the water so collected from coming in contact with either the walls or the foundation of the building on which they are installed. Downspouts receive water from the rain gutters and conduct the water, isolated from the weather shell of a building, to the foundation of the building. Equally, or perhaps more important than the downspouts which conduct rain water past the walls of a building, are the downspout laterals which conduct the water away from the building foundation.

Buildings which have large roof line overhangs of two, three or more feet can possibly get along without a rain gutter system. Nonetheless, all buildings benefit from a rain gutter system. In many buildings that are constructed for architectural or functional reasons with little or no roof overhang rain gutters and downspouts are essential to prevent moisture penetration of the walls of the building. Moisture penetration of the walls of a building leads to structural defects and to warping and rotting or corrosion of the structural components of the walls. Leakage of rain water through the walls also damages the contents of a building.

What is not always as well understood is that rain water deposited at the foundation of a building can have even greater consequences. Excess water deposited at the foundation of a building can result in a leaky foundation which in the case of a basement can result in flooding and in the case of a house built over a crawl space or on a slab can result in the rotting of sill plates and any structural member in contact with the foundation. Excess rain water deposited adjacent to the foundation can also result in the buckling or collapsing of the interior basement or foundation walls, completely undermining the structural integrity of a building.

Thus, downspouts normally have short sections of gutter pipe, known as downspout laterals, which channel the water from the downspouts away from the foundation. The foundation around a buildings is normally graded so as to slope gently away from the foundation. Thus water once removed from the immediate vicinity of the foundation is rapidly removed from the area of the building by the slope of the ground.

A problem with downspout laterals is that they quite frequently extend into the lawn surrounding a building or dwelling and therefore interfere with the mowing and upkeep of the landscape. Unless the laterals are laboriously disassembled and reassembled each time the lawn is mowed, patches of unsightly, uncut grass and weeds develop about the laterals. To overcome this problem, laterals which are hinged to the downspout and tilt up out of the way have been developed. However, the nature of the geometry of most downspouts and hinged laterals is such that their stability in the tilted up position is at best precarious, thus, there is a need for some retention device to retain the tilted up lateral while yard maintenance is being conducted.

Downspout retention devices are known. For example, U.S. Pat. No. 3,861,419 to Johnson, discloses a J-shaped clip which retain the upper edge of a tilted-up downspout lateral. However, the Johnson retention device is required to be positioned at a fixed location on the downspout and thus must be employed with a lateral whose dimensions are known and thus requires careful fitting of the downspout lateral. Most downspouts are assembled with interfitting, sleave joints which by their nature are not precise in locating the joint. Other tip-up retaining devices such as those shown in U.S. Pat. Nos. 4,270,572 and 5,014,745, not adjustable and require one or more components to be accurately and fixedly screwed or attached to either the downspout, the lateral or both.

Not only can additional costs and installation effort be required with prior art downspout clips, but the prior art clips can be themselves visually unsightly.

What is needed is a downspout clip for retaining tipped up laterals which is simple to install and utilize and has minimum visual impact.

SUMMARY OF THE INVENTION

The clip of this invention has a C-shaped body constructed of transparent, resilient plastic. The C of the clip forms a first arm and a second arm which are opposed and which join a front member at approximately 90 degrees to form the C shape. The ends of the arm which extend away from the front member have fingers which angle inwardly at approximately 45 degrees to grip a downspout. The C-shaped body of the clip has three depending lips for retaining a downspout lateral.

In use, the clip is resiliently snapped onto the downspout. The lateral is tilted upwardly until the upper edge of the lateral rests against the front face of the clip where upon the clip is slid down slightly until the lip on the face opposite the lateral engages the upper edge of the lateral and thereby retains it.

It is an object of the present invention to provide a downspout lateral retention bracket for holding a downspout lateral in a tipped up condition.

It is another object of the present invention to provide a downspout lateral retention bracket which is visually unobtrusive.

It is yet another object of the present invention to provide a downspout lateral retention bracket which is readily adjustable on a downspout.

It is a further object of the present invention to provide a downspout lateral retention bracket which can accommodate downspout laterals of various sizes.

Further objects, features and advantages of the invention will be apparent from the following detailed description when taken in conjunction with the accompanying drawings.

BRIEF DESCRIPTION OF THE DRAWINGS

FIG. 1A is an isometric view of the downspout lateral retention clip of this invention.

FIG. 1 is an isometric view illustrating the position and function of the downspout lateral retention clip of this invention.

FIG. 2 is a top plan view of the downspout retention clip of FIG. 1.

FIG. 3 is a rear elevational view of the clip of FIG. 2 taken along line 3—3.

FIG. 4 is a side-elevational view of the clip of FIG. 2 taken along line 4—4.

DESCRIPTION OF THE PREFERRED EMBODIMENT

Figure 5:
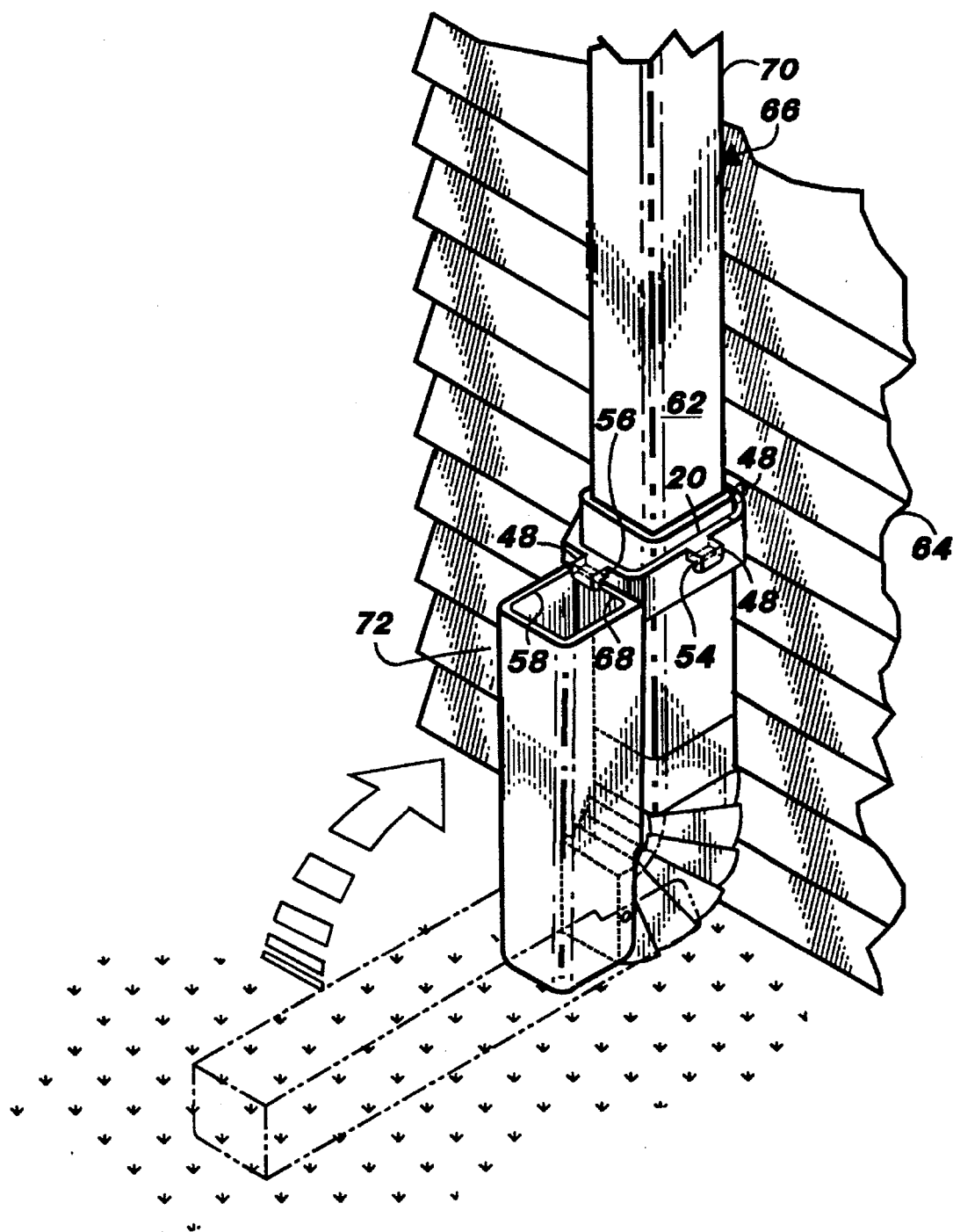
FIG. 5 is an isometric view illustrating an alterative position for the downspout lateral retention clip of this invention.

Referring more particularly to FIGS. 1–5 wherein like numbers refer to similar parts, a downspout clip 20 serves as a bracket to retain a downspout lateral 22 as shown in FIG. 1. The downspout lateral 22 is attached by a hinge 24 to a rain gutter downspout 26 which receives water from a rain gutter. The clip 20 has a C-shaped body 28 which has a first ann 30 and a second arm 32 which are co-formed with a front member 34. The arms 30, 32 have inwardly extending fingers 36, 38. The fingers 36, 38 extend towards each other making an angle of approximately forty-five degrees with the arms 30, 32. The fingers 36, 38 and the arms 30, 32 and the front member 34 form an overall C-shaped profile.

The clip 20 may be injection molded of transparent, resilient plastic such as polycarbonate resin.

The C-shaped body 28 is dimensioned so that the inside perimeter 40 will closely fit a standard downspout cross-section. The inside perimeter defining a partially inclosed area which in the illustrated downspout clip in FIGS. 1–5 has dimensions of approximately 3.25 inches between the inside surfaces of the arms 30, 32, and a dimension of 1.75 inches between the inside surface of the front member and the juncture of the arms 30, 32 with the fingers 36, 38. The upper surface 42 of the body 28 is approximately one-eighth of an inch wide with the lower surface 44 having the same width. The distance between the upper surface 42 and the lower surface 44 in one exemplary clip may be seven-eighths of an inch.

The front member 34 and the arms 30, 32 flex and allow the arms 30, 32 to be bent outwardly so that a downspout 26 may pass between the opening defined by the arms 36, 38. For retaining of the downspout lateral 22, the clip 20 has a front facing lip 46 and two side facing lips 48. The lips 46, 48 extend outwardly and downwardly from the upper edge 50 formed by the juncture of the outside perimeter 52 and the upper surface 42. The lips 46, 48 define gaps 54, 56 which engage the upper edge 58 of the downspout lateral 22. In operation, once the downspout clip 20 has been installed on a downspout 26, it is positioned so that when a downspout lateral 22 is tipped up it comes to rest against the front face 60 of the front member 34. The clip 20 is then slid downwardly until the gap 56 formed between the lip 46 and the front surface 60 engages the upper edge 58 of the lateral thus retaining it in place.

Downspouts are typically rectangular in cross-section and typically have the widest side 62 adjacent to the side 64 of a building as illustrated in FIG. 1. However, as shown in FIG. 5, in some instances a downspout 70 will be installed with the narrow wall 66 of the downspout 70 oriented adjacent to the wall 64. In which case, the downspout lateral 72 will be hinged so that its narrow upper edge 68 will engage with a side lip 48. To accommodate both types of downspout installations, the clip 20 is adjustable to all orientations in which standard size downspouts are normally employed.

Because the downspout clip 20 is transparent, it does not need to be painted or colored to match the color of the downspout with which it is employed. Thus, a single clip may function with a wide variety of colors of downspouts facilitating the cost-effective production and distribution of the clips 20.

It should be understood that the clips 20 may be made in a number of sizes and configurations to function with downspouts of other standard sizes.

It should also be understood that the clip could be made of translucent material which would allow the color of the downspout 26 to control its appearance.

It should also be understood while the downspout clip 20 is preferably formed by injection molding, it could be formed by extrusion with the lateral retaining lips attached by bonding.

It should be understood that the invention is not limited to the particular construction and arrangement of parts herein illustrated and described, but embraces such modified forms thereof as come within the scope of the following claims.

I claim:

1. A clip for retaining a downspout lateral in a pivoted orientation against a downspout; the clip comprising:

a) a plastic front member which engages against a downspout;

b) two arms integrally formed with the front member which extend rearwardly from the front member, and which are spaced generally parallel from one another to lie on opposite sides of the downspout, wherein the front member and arms define a clip body having an upper edge, and wherein the arms are flexible with respect to the front member to resiliently grip the downspout and engage the clip at a desired elevation thereon; and b) at least one lip which extends outwardly from the upper edge and which is spaced outwardly from the clip body to define a gap between the body and the lip which selectively receives a pivoted downspout lateral, and holds said lateral in an elevated position to permit mowing beneath the downspout.

2. The apparatus of claim 1 wherein the clip is transparent.

3. The apparatus of claim 1 wherein the arms extend rearwardly from the front member at an angle of approximately 90 degrees, and wherein a finger extends inwardly from each arm at approximately 45 degrees, the fingers extending toward each other to grip the downspout.

4. The apparatus of claim 3 wherein at least one lip depends from each arm and the front member so the clip may be alternatively positioned to engage downspout laterals on an arm or on the front member.

5. A downspout assembly of the type having a downspout lateral hinged to a downspout so the lateral may be tilted up to allow a lawn mower to mow beneath the lateral, the improvement comprising:

a) a C-shaped clip body formed of resilient plastic, wherein the clip resiliently grips the downspout to retain the clip on the downspout; and b) at least one lip extending outwardly and downwardly from the clip body on the downspout, wherein the lip is positioned to retain the downspout lateral in a tilted orientation with respect to the downspout.

6. The apparatus of claim 5 wherein the clip is transparent.

7. The apparatus of claim 5 wherein the clip body has a first arm and a second arm, and the opposed arms are joined by a front member, and wherein the arms join the front member at an angle of approximately 90 degrees, and wherein a finger extends rearwardly and inwardly from each arm at approximately 45 degrees to grip the downspout.

8. The apparatus of claim 7 further comprising at least one lip depending from each arm and the front member so the clip will retain a downspout lateral positioned to pivot frontwardly or sidewardly with respect to the downspout.

9. A clip for retaining a downspout comprising:

a) a C-shaped clip body formed of resilient material, the clip having an inside perimeter, an outside perimeter, an upper surface, a lower surface, and an upper edge formed by the upper surface and the outside perimeter, and wherein the inside perimeter resiliently grips a downspout to retain the clip on the downspout; and b) at least one lip extending outwardly away from the body and downwardly from the upper edge towards the lower surface, wherein the lip extends less than the distance between the upper surface and the lower surface along the outside perimeter to retain an engaged downspout lateral between the lip and the clip body in a tilted orientation.

10. The apparatus of claim 9 wherein the clip is made of transparent plastic.

11. The apparatus of claim 9 wherein the clip body has a first arm and a second arm, and the opposed arms are joined by a front member, and wherein the arms join the front member at an angle of approximately 90 degrees, and wherein a finger extends rearwardly and inwardly from each arm at approximately 45 degrees to grip the downspout.

12. The apparatus of claim 11 further comprising at least one lip depending from each arm and the front member so the clip will retain a downspout lateral positioned in a sideward or frontward orientation to the downspout.

* * * * *